ELECTRICAL FREQUENCY DISCRIMINATOR CIRCUIT

Filed Jan. 14, 1947 2 Sheets-Sheet 1

Inventor
CHARLES E. DENNIS
By [signature]
Attorney

Oct. 17, 1950 C. E. DENNIS 2,525,780

ELECTRICAL FREQUENCY DISCRIMINATOR CIRCUIT

Filed Jan. 14, 1947 2 Sheets-Sheet 2

Inventor

CHARLES E. DENNIS

By F. J. Schmitt

Attorney

Patented Oct. 17, 1950

2,525,780

UNITED STATES PATENT OFFICE 2,525,780

ELECTRICAL FREQUENCY DISCRIMINATOR CIRCUIT

Charles E. Dennis, Washington, D. C.

Application January 14, 1947, Serial No. 722,017

13 Claims. (Cl. 250—27)

(Granted under the act of March 3, 1883, as amended April 30, 1928; 370 O. G. 757)

This invention relates to electrical frequency discriminator circuits.

Frequency discriminator circuits in the past have depended upon the fundamental principle of tuning the two halves of the secondary of a transformer to two different frequencies, one half tuned slightly above a fixed frequency and the other half tuned slightly below. The center tap of the transformer is grounded and each half of the transformer then feeds its voltage to a thermionic tube. Each vacuum tube in turn feeds a resistor which has a grounded center tap. In this way the output across the resistor will vary in accordance with the changes in frequency across the transformer. Thus, the mid-frequency will produce no output while the frequency slightly above mid-frequency will produce a positive voltage while the frequency slightly below mid-frequency will produce a corresponding negative voltage. An improvement on the fundamental circuit is the well known Foster Seeley circuit.

The prior methods, however, are subject to instability and complexity in tuning of the circuit components. Considerable study has been given to the problem in an effort to produce a stable but readily adjustable frequency discriminator circuit but prior to my invention no completely satisfactory method has been provided.

Accordingly, it is an object of this invention to provide a frequency discriminator circuit with a high degree of stability.

It is another object of this invention to provide a discriminator circuit which is capable of being adjusted to zero balance quickly and conveniently.

It is another object of this invention to provide a discriminator circuit capable of providing a high degree of accuracy hereto unavailable, for use in test circuits for testing the reactance of components such as capacitors and inductors.

It is another object of this invention to provide a discriminator circuit which may be used for test purposes providing a speedy and accurate test for circuit components.

It is another object of this invention to provide a discriminator circuit for test purposes capable of use over a wide range of frequencies which frequencies may be readily varied.

It is another object of this invention to provide a discriminator circuit which will maintain linearity over a wide deviation from mid-frequency with a maximum of sensitivity and stability.

It is a further object of this invention to provide a discriminator circuit for test purposes which will provide a quick and convenient indication of variations in magnitude and direction, of components under test.

It is a further object of this invention to provide a circuit for detecting changes in magnitude and direction of frequency or reactance values, which changes may be due to mechanical motion or electrical characteristics of dielectrics and core materials.

It is a further object of this invention to provide a discriminator circuit for use with radio receivers for frequency modulation reception and automatic frequency control.

Other objects will be apparent to those skilled in the art after a study of the following description, claims and drawings, in which Fig. 1 is a circuit diagram illustrating a basic form of the invention;

Figs. 2*a* and 2*b* are vector diagrams of the voltage at various points of the circuit;

Figure 1:
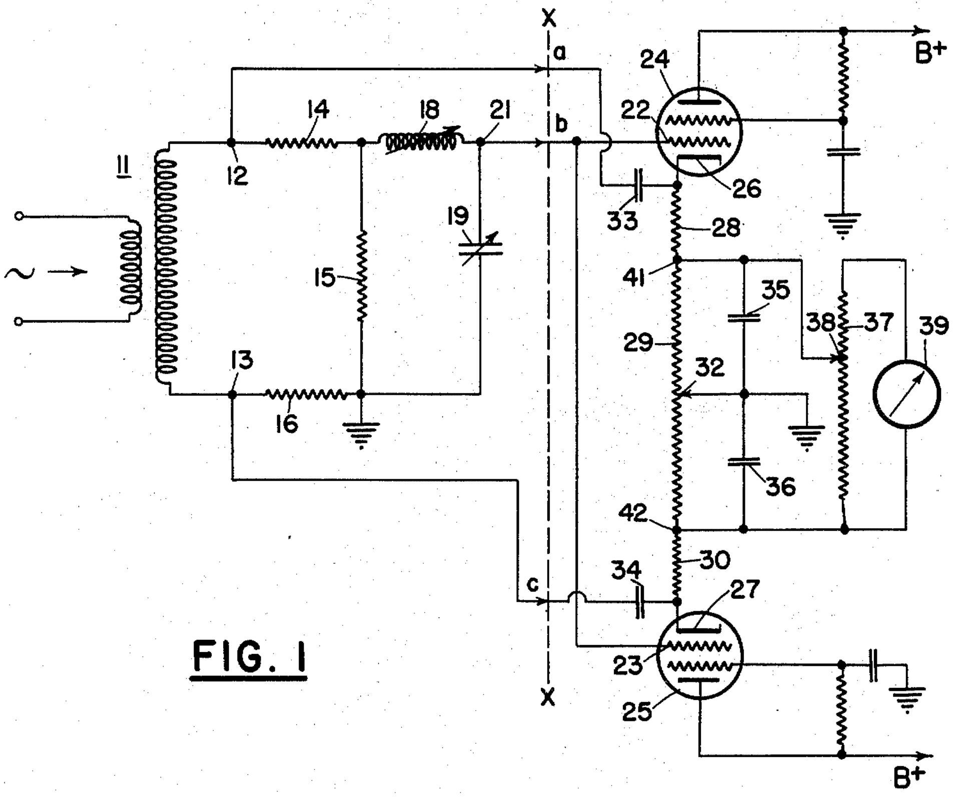

Referring now in more detail to Fig. 1, there may be seen an input transformer denoted generally by the numeral 11 with the secondary connected to terminals 12 and 13. Transformer 11 is the signal input transformer which may be either audio frequency or radio frequency depending upon the particular frequency with which the circuit is used.

Across the secondary of transformer 11 there are connected resistors 14, 15 and 16 which provide the load for the transformer. Resistor 16 is equal in value to the sum of resistor 14 and resistor 15. It is preferred that these resistors 14, 15 and 16, be of the carbon type, so as to reduce to a minimum the inherent inductance.

The point of connection between resistor 15 and resistor 16 is grounded so that the resistances provide a balanced load each side of ground.

Across resistor 15 there is connected in series an inductance 18 and capacitance 19. In the preferred form of the invention inductance 18 and capacitance 19 represent a series resonant circuit at a given desired frequency. Their values therefore will vary in accordance with the frequency with which the discriminator circuit is to be used, and are chosen in accordance with fundamental principles. Inductance 18 and capacitance 19 may be fixed or variable as desired.

As may be seen, capacitance 19 is connected to terminal 21, the point of connection to inductance 18, with the other end connected to ground at terminal 17. Terminal 21 is also connected to the input grids 22 and 23 of thermionic tubes 24 and 25, respectively. Tubes 24 and 25 are balanced and operated as rectifiers or detectors. As I have illustrated the tubes in Fig. 1 tetrodes are provided having an input grid and a screen grid. This is an arbitrary choice, however, and it will be readily apparent to those skilled in the art that any tube may be used which may be operated as a detector.

Cathodes 26 and 27 of tubes 24 and 25, respectively, are connected to each other through series resistances 28, 29 and 30. Resistances 28 and 30 are low in value and equal to each other. Resistance 29, which is the center resistance of the three, is provided with a tap 32 which may be connected to ground. In normal operation tap 32 will be at the mid-point of resistor 29 so that the total resistance value from cathode 26 to ground will be equal to the resistance from cathode 27 to ground.

Cathode 26 is also connected through a capacitor 33 to terminal 12 or the top of the secondary of transformer 11. Similarly, cathode 27 is connected through a capacitor 34 to terminal 13 or the opposite end of the secondary of transformer 11. Capacitors 33 and 34 are equal in value. This latter connection provides a cathode feed of the output of the secondary of transformer 11 to tubes 24 and 25 through the cathode connection. Thus, cathode 26 will have applied thereto the voltage across resistances 14 and 15 while cathode 27 will have applied thereto the voltage across resistance 16. In normal operation voltages applied to the respective cathodes will be equal in quantity and opposite in phase.

Across resistance 29, which is the center resistance between cathodes 26 and 27, there is connected another capacitor 35 and capacitor 36 in series. The common connection of capacitors 35 and 36 is grounded. Thus, there results a capacitor 35 across one half of resistance 29 and capacitor 36 across the other half of resistance 29.

A resistance 37 in the form of a potentiometer is provided across capacitors 35 and 36 by connecting the tap 38 of potentiometer 37 to the upper side of capacitor 35 and the lower connection of the resistance element to the upper side of capacitor 36. A suitable meter 39 which provides bi-directional or zero center reading is connected across the resistance element of potentiometer 37. Thus, potentiometer 37 provides the meter sensitivity adjustment.

The other elements of tubes 24 and 25 are connected in any of the well known ways to provide detector action as mentioned previously. Triodes or pentodes are preferred in order to reduce the impedance or load for the voltage to ground across capacitor 19. The resistor 29 provides the necessary D. C. balance thereby compensating for variations in the different components of the circuit which, though theoretically should be equal, as a practical matter, as well understood by those experienced in the art, may vary to some extent. Resistances 28 and 30 and capacitors 35 and 36 should be relatively low in value so as to avoid a high impedance to ground and resultant degeneration through cathode follower action. Resistance 15 should not be too large so as to be small compared with the series resonant impedance across inductance 18 and capacitor 19.

The operation of the circuit is as follows:

The signal frequency is applied from any source to the primary of transformer 11. The resultant voltage across the secondary of transformer 11 will appear across the resistance load of the resistances 14, 15 and 16. The voltage appearing across resistances 15 and 14 will appear at the cathode 26 of tube 24. An equal voltage appearing across resistance 16 will appear at cathode 27 of tube 25.

At the same time the voltage appearing across resistance 15 alone will appear across the impedance of the inductance 18 and capacitance 19. The reactance of inductance 18 and capacitance 19 is equal and opposite to each other with a resultant series resonant circuit at the operating frequency. The phase shift across capacitor 19 is then 90° out of phase with respect to the voltages appearing at cathodes 26 and 27. This voltage appearing across capacitor 19 being applied to input grids 22 and 23, will add vectorially to the voltage applied to the respective cathodes.

Figure 2A:
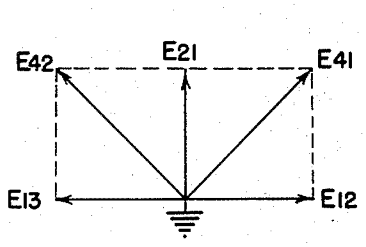
Figure 2B:
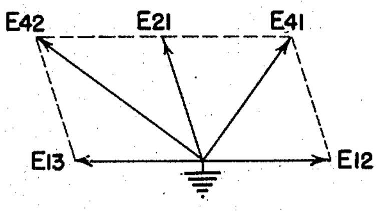

This is illustrated in Fig. 2 which shows the voltage $E_{12}$ and $E_{13}$ to be equal and opposite in phase and $E_{21}$ having a 90° phase relationship therewith. $E_{21}$ is equal to $$\frac{L_{18}}{R_{eff}}E_{R15} \text{ or } QE_{R15}$$

$E_{R15}$ is proportional to $$\frac{1}{Q}\times E_{21}$$

and the value relative to $E_{12}$ and $E_{13}$ will depend on circuit design.

The resultant voltage appearing across resistance 29 from terminals 41 and 42 to ground respectively will be the resultant of the vector sum of $E_{12}$ and $E_{21}$ and $E_{13}$ and $E_{21}$ respectively. By referring carefully to Fig. 2, it may be seen that at the resonant frequency $E_{41}$ is equal to $E_{42}$. The resultant voltage applied to potentiometer 37 is zero since the only voltage appearing across potentiometer 37 will be the difference in voltage between $E_{41}$ and $E_{42}$. The resultant meter reading will then be zero. This indicates resonance at the operating frequency.

A change in frequency in either direction will cause the voltages appearing at terminals 41 and 42 to be different. This will be apparent by referring to Fig. 2*a* which illustrates vectorially the quantity and relationships of the various voltages. Thus, with a variation in frequency inductance 18 and capacitor 19 will no longer be a series resonance circuit and accordingly, the reactance of one will be greater than the other depending on the direction of change in frequency. Thus, when the voltage across capacitor 19 adds vectorially in tubes 24 and 25 with the voltages applied to the respective cathodes from the secondary of transformer 11 as explained previously, the resultant voltage appearing across the opposite ends 41 and 42 of resistance 29 to ground will vary in magnitude. For instance, if the frequency by variation is lower than the mid-frequency or resonance frequency the voltage across capacitor 19 or $E_{21}$ will vary from the 90° phase relationship to $E_{12}$ or $E_{13}$, and the voltage appearing at terminal 41 will be decreased accordingly while the voltage appearing at terminal 42 will be increased in the same proportion. This condition is illustrated in Fig. 2. A voltage difference thus appears across potentiometer 37 which voltage difference will be indicated by the meter 39.

Similarly, if the frequency applied to transformer 11 is higher than the mid-frequency or resonance frequency the voltage appearing at terminal 42 will be decreased and the voltage appearing at terminal 41 will be increased proportionally, due to the vectorial adding of the voltage across the resonance network in tubes 24 and 25. Again a difference in potential between terminals 41 and 42 will appear across potentiometer 37 which will be indicated by meter 39, this time in the opposite direction.

Thus, the direction of frequency change will be indicated directly by meter 39, and at the same time, due to the vectorial adding of the voltages in tubes 24 and 25, the magnitude of frequency deviation from mid-frequency will be indicated by the meter 39.

Additionally, it is readily apparent to those skilled in the art that while changes in frequency cause corresponding changes in direction and magnitude indicated by the meter 39, it is due to the change from resonance in the series inductance-capacitance circuit of inductance 18 and capacitor 19. Thus, a change in value of either inductance 18 or capacitance 19 or the frequency of the generator will cause the resultant voltages to vary through the vectorial adding in tubes 24 and 25. A change in value of capacitor 19 for instance, will be indicated by the meter 39 in both magnitude and direction. Similarly, a change in value of inductance 18 will be indicated by the meter 39 in both magnitude and direction.

One value of the circuit described, representing a great improvement over frequency discriminator circuits heretofore known, lies in the high degree of stability and accuracy. For instance, the tap 32 on resistance 29 is made available in the preferred form. If this variable tap 32 is provided with a convenient control it may be varied at will. Whenever the circuit is in use tap 32 may be adjusted across resistance 29 to provide zero reading on meter 39. Such an adjustment compensates quickly and conveniently for any changes that may take place in the various components of the circuit. Thus, while certain components should be equal for correct balancing as explained previously, variations in equality of these components may be quickly compensated for by the tap 32 on resistance 29. Similarly, variations which take place in the circuit due to changes in temperature or other climatic conditions again may be quickly compensated for by tap 32 on resistance 29.

Also, I have found in using my circuit that when tap 32 has been set for any combination of components in the circuit an exceedingly high degree of stability results over a long period of time as contrasted with other circuits known. This is due to the balancing of the various voltages and the vectorial addition thereof in tubes 24 and 25.

Furthermore, when a reduction of the Q of the L—C circuit is necessary to provide indications far removed from the generator frequency overall sensitivity may be maintained by increasing the value of $R_{15}$.

It will be apparent to those skilled in the art that the discriminator circuit which I have provided is available for a great variety of uses. For instance, it may be used as a test circuit which will indicate changes in frequency. Another exceedingly valuable use is that of a test circuit for testing reactance components such as mass production tests of either capacitors or inductances.

For such purposes a capacitor 19 may be used in the circuit with inductance 18 omitted. The terminals for coil 18 may be provided at a suitable terminal board on the panel of the case in which the discriminator circuit is enclosed. Thus, if coils are to be tested on a mass production basis for a radio frequency receiver for instance, a frequency is chosen and the capacitor 19 adjusted with a fixed standard inductance, across the test terminals providing a zero reading on meter 39. The various coils to be tested may then be substituted consecutively across the test terminals in place of the standard coil. Variations in the various components being tested will be indicated by meter 39 in both magnitude and direction with a single reading. Such readings with high accuracy and stability for mass production tests on a reactance component heretofore have not been made available.

A wide band of frequencies may be readily applied to the transformer 11 by using with my discriminator circuit a suitable variable frequency oscillator for feeding the input transformer 11. Thus, as the frequency is varied the capacitor 19 may be varied accordingly, to provide resonance in the test illustration explained above.

Also, the meter is subject to sensitivity adjustment by means of the potentiometer 37. Varying degrees of accuracy may readily be made by suitable adjustments of potentiometer 37, by means of the variable tap 38 with compensations by the variable tap 32 on resistance 29 and the test circuit of the variable capacitor 19, and the variable frequency oscillator (not shown). Thus, a vast field is available for test purposes.

It is readily apparent to those skilled in the art that while I have explained the operation for testing inductance, capacitors may be tested on a mass production basis in the same way.

Meter $M_{39}$ is preferably calibrated in percentage deviation from the standard network.

Another use to which my circuit may be put which will be of great value to the industry is that of a discriminator circuit in a radio receiver for use for the reception of frequency modulated signals. In such a case a circuit similar to that shown in Fig. 3 may be used by substituting an audio frequency transformer across terminals 41 and 42 in place of the resistance 37 and the meter 39, of Fig. 1. The input signal applied to transformer 11 will be that of the I. F. circuit presently used in the receivers. A limiter is used in the usual way and the operation thereof is not affected by my circuit. In this way, frequency deviations which occur in the signal are applied to the transformer 11 with the direction and magnitude of deviation being indicated by the change in voltages appearing at terminals 41 and 42.

As is well understood by those skilled in the art, the frequency modulated signals today are fixed, for any given transmission, in the amount of deviation from mid-frequency, usually approximately 75 kc. either side of mid-frequency for broadcast purposes or approximately 15 kc. either side of mid-frequency for communication purposes. The rate of deviation from mid-frequency determines the audio frequency. Thus, the amount of deviation in frequency from the signal input will be indicated by a corresponding change in magnitude at terminals 41 and 42. When the frequency is above mid-frequency for instance, the voltage at terminal 41 will increase and the voltage at terminal 42 will decrease proportionally. When the frequency swings to the other side of mid-frequency the voltage at terminal 41 will correspondingly decrease and the voltage at terminal 42 will correspondingly increase. These changes in voltages will appear in the audio frequency transformed 50 shown in Fig. 3. The rate of change in frequency will determine the rate of change in voltages at terminals 41 and 42. Thus, the rate of change in voltages at terminals 41 and 42 determines the frequency appearing across audio frequency transformer 50. The rate of change of frequency modulation signal appearing across transformer 11 from the I. F. portion of the radio receiver determines the rate of change appearing across transformer 50 in the audio frequency circuit, this determining audio frequency which is of course the signal frequency. The magnitude of the voltage appearing across terminals 41 and 42 may be adjusted in accordance with usual well known practice according to the amount of deviation from mid-frequency of the transmitted signal so that the magnitude of the audio frequency voltage appearing across transformer 50 is normal.

Figure 3:
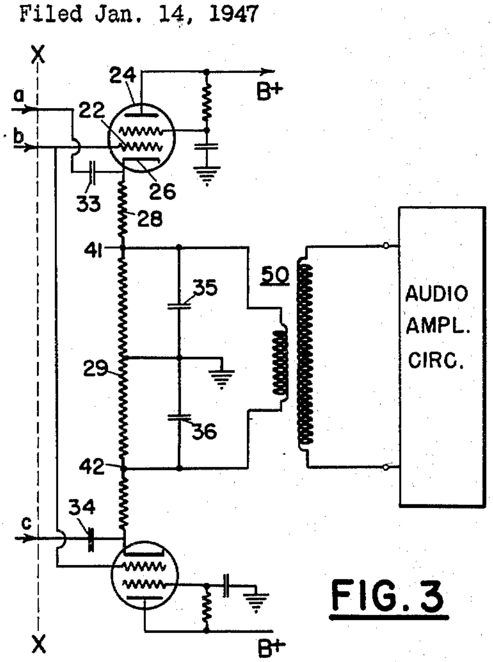
Fig. 3 is a modification of the circuit according to the invention for use for the reception of frequency modulated signals.

It will be apparent to those skilled in the art that when my discriminator circuit is used for the reception of frequency modulated signals it is not necessary that all of the components shown in Figs. 1 and 3 are needed. Thus, as explained previously, a deviation in frequency input from mid-frequency will cause a corresponding change in the voltage across terminal 41 to ground. A change in frequency in one direction will cause the voltage across terminal 41 to ground to increase while the change in frequency in the other direction will cause the voltage across voltage terminal 41 to ground to decrease. This is due to the fact that the voltage from terminal 12 to ground at transformer 11 is added vectorially with the voltage from 21 to ground in tube 24.

Figure 4:
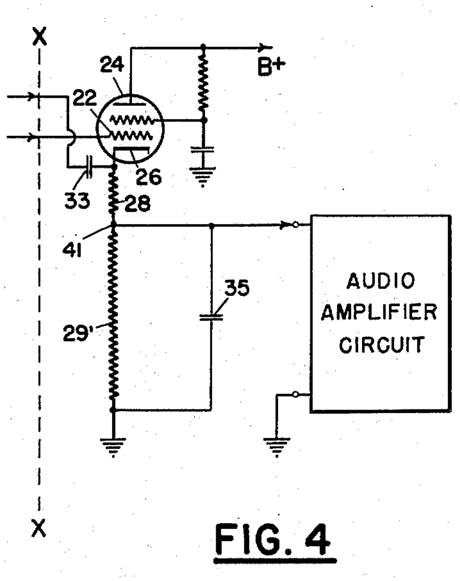
Fig. 4 is a further modification for frequency modulation reception.

Thus, for frequency modulation purposes, the frequency deviation of the signal will cause a voltage deviation corresponding in direction and magnitude, across terminal 41 to ground. Any of the well known audio frequency amplifying circuits may be connected across terminal 41 to ground. The changes in voltage across the terminal 41 to ground will cause audio frequency changes which may be amplified. This circuit is shown in Fig. 4.

While variations in frequency or variations in the reactance components of my circuit have been illustrated as based on an initial or midpoint in which the phase relation of the voltage appearing at terminal 21 to that of the voltages appearing at terminals 12 and 13 is 90°, it will be apparent to those skilled in the art that phase differences intermediate this relationship may be made useful. Thus, the phase relationship of $E_{21}$ to $E_{12}$ may be 45° by suitable adjustment, according to well known practice, of the reactance values of either the inductance 18 or the capacitor 19. Further changes in either frequency or component values as explained above will cause the phase relationship to vary either side of 45° rather than either side of 90°.

In the basic form of my invention as illustrated in Fig. 1, there is a resistance load across the secondary at transformer 11. A resistance load of course constitutes a source of loss of energy. It is always desirable to avoid any unnecessary loss of energy. Therefore, I have devised a modification of my discriminator circuit which does away with that resistance load. This modification may be seen by referring to Fig. 5.

Figures 5, 6, 7:
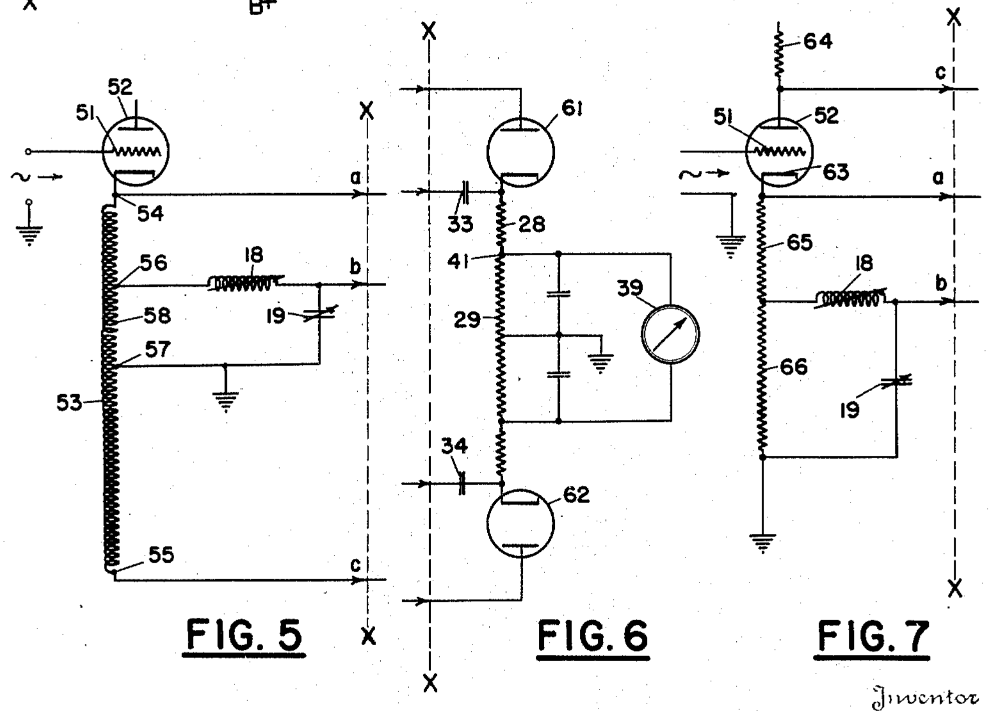
Fig. 5 is an additional modification of the circuit diagram of Figure 1.
Fig. 6 is a further modification of the tube circuit.
Fig. 7 is still another modification of the tube circuit.

The transformer 11 and the resistance 14, 15 and 16 arcoss the secondary thereof are eliminated and replaced by a thermionic tube having in the cathode lead an inductance or coil which is provided with two taps near the center thereof. As seen in Fig. 5, the signal source is applied to a grid 51 of thermionic tube 52. A coil 53 in the cathode lead has a terminal 54 at the top and a terminal 55 at the bottom with two additional taps 56 and 57 near the center of the coil. Tap 57 is at the electrical mid-point of inductance coil 53 and tap 56 is connected a short distance electrically above tap 57 so as to provide a small amount of impedance 58 near the center of the coil 53.

With this modification of my discriminator circuit capacitor 33 is connected between cathode 26 of tube 24 and the terminal 54 of the inductance coil 53. Capacitor 34 is connected between cathode 27 of tube 25 and the lower terminal 55 of inductance coil 53. The inductance 18, which is part of the series resonant circuit, is connected to terminal 56 or one tap of coil 53 while capacitor 19 is connected, as before, between inductance 19 and tap 57 of coil 53, to complete the resonant circuit. Tap 57 is grounded.

In operation the signal is applied to the grid 51 of tube 52. Through cathode follower action a voltage exists across terminal 54 and ground which is thereby applied to the cathode 26 of tube 24 as explained previously in connection with Fig. 1. Similarly, through cathode follower action of the tube 52 a signal voltage exists between terminal 55 of coil 53 and ground which voltage is applied to cathode 27 of tube 25. Also, a signal voltage exists across portion 58 of coil 53, thus providing a voltage input between terminal 56 and ground across the series resonant circuit of inductance 18, and capacitor 19. The voltage across capacitor 19 which is 90° out of phase with each of the voltages from terminals 54 and 55 at resonant frequency is applied as before to the grids 22 and 23 of the tubes 24 and 25. Here, the voltage across capacitor 19, that is, $E_{21}$, adds vectorially with each of the voltages across the two halves of coil 53, that is, $E_{12}$ and $E_{13}$, in the same manner as explained in connection with the circuit of Fig. 1.

With this modification I have eliminated the energy loss in a resistance load. The fundamental operation of my discriminator circuit is not affected in any way so that the same result is obtained at meter 39.

As may be seen in Fig. 6, the use of diodes 61 and 62 in place of tubes 24 and 25 of Fig. 1 may be made readily. No circuit changes are involved other than the connection of the signal from terminal 21 to the anode of tubes 61 and 62. The connection from terminals 12 and 13, the circuit of Fig. 1, are made through capacitors 33 and 34, respectively, to the respective cathodes of the diodes 61 and 62.

A further modification is possible. For instance, it may be desirable to eliminate tube 52 and feed the signal to coil 53 by transformer action from a primary winding.

Fig. 7 shows a further modification, wherein resistances 65 and 66 serve the same purpose as elements 14 and 15 in Fig. 1, and 64 furnishes the voltage previously derived from across resistance 16 of Fig. 1. The voltage across 64 is equal and opposite to the voltage developed across 65 and 66, and produces the desired voltages from the points A, B and C to ground.

While the discriminator circuit has been illustrated and described as used with an indicating meter or with an audio amplifying circuit in the case of frequency modulation receivers, it will be apparent that the output across terminals 41 and 42 of Fig. 1 may be connected to any desired circuit network. For instance, the changes in frequency or reactance values, as explained above, may be transmitted to a distant point. In this way changes in mechanical motion may be utilized at a point remote therefrom. Thus, my circuit may be of advantage in remote control application.

While various modifications of the circuit have been illustrated and described, further modifications will be apparent to those skilled in the art. Modifications will vary in accordance with the use, and the uses of my circuit are many.

The invention described herein may be manufactured and used by or for the Government of the United States of America for governmental purposes without the payment of any royalties thereon or therefor.

What is claimed is:

1. A reactance test circuit comprising a signal input circuit, a reactive impedance circuit connected across a portion of said input circuit, a circuit for adding vectorially the voltage across one element of said reactive impedance circuit to at least a portion of the voltage of said input circuit and means connected to said adding circuit for indicating variations in reactance in said reactive impedance circuit.

2. A discriminator circuit comprising a signal input circuit, a series reactance circuit connected across a portion of said input circuit, and means for adding vectorially the voltage across one reactive impedance of said reactance circuit to the voltage across at least a portion of said input circuit.

3. A frequency discriminator circuit comprising a signal input impedance, a series resonance reactance circuit connected across a portion of said input impedance, and means for mixing the voltage across one element of said reactance circuit with the voltage across a portion of said input impedance whereby said voltages are added vectorially.

4. A frequency discriminator circuit comprising a balanced load with a center tap, a reactive impedance connected across a portion of said balanced load, and thermionic means for mixing the voltage across said reactive impedance with the voltage across each balanced portion of said load whereby the voltages are added vectorially in said thermionic means.

5. A frequency discriminator circuit comprising a signal input circuit, a resistive load across said input circuit, a series resonance reactance circuit connected across a portion of said resistive load, a pair of thermionic tubes, means for feeding the voltage across a portion of said resistive load to a first element of one tube, means for feeding an equal voltage across another portion of said resistive load to a first element of the other tube, means for feeding the voltage across one element of said series reactance circuit to a second element of each of said thermionic tubes whereby the voltage across said reactance circuit, being out of phase with each said voltage across said resistive load, is added vectorially therewith, and means for indicating said vectorially added voltages.

6. The combination of claim 5 including means for balancing the output of said one thermionic tube with the output of said other thermionic tube, and means for indicating the magnitude and direction of unbalance.

7. A frequency discriminator circuit comprising a signal input inductive impedance, said inductive impedance having a center tap, means for feeding the voltage across each half of said inductive impedance to a balanced load, a series resonant reactive impedance connected across a portion of said inductive impedance and means for feeding the voltage across a portion of said reactive impedance to said balanced load whereby the voltages are added vectorially.

8. A frequency discriminator circuit comprising a signal input transformer, a first balanced resistive load connected across the secondary of said transformer, a series resonance circuit comprising inductance and capacity connected across a portion of said first balanced resistive load, a first thermionic tube and a second thermionic tube, a first element of said first tube being connected across one half said first resistive load and a first element of said second tube being connected across the other half of said first resistive load, a second element of each of said tubes connected across one element of said series resonance reactive impedance, a second balanced resistive load connected in the output of said tubes whereby voltages are added vectorially across said second resistive load and means for indicating the magnitude and direction of voltage unbalance existing across said second load.

9. A discriminator circuit comprising a balanced signal input circuit, a reactive impedance circuit connected across a portion of said input circuit and means for adding vectorially the voltage across at least a portion of said reactive impedance circuit to the voltage across at least a portion of said input circuit, said means being independent of the phase shift occurring in said input circuit.

10. A discriminator comprising an input circuit, a series resonant reactance circuit connected across a portion of said input circuit, and means for adding vectorially the voltage across one element of said reactance circuit to the voltage across at least a portion of said input circuit.

11. A discriminator comprising an input circuit, a balanced load connected across said input circuit, a reactive impedance circuit connected across a portion of said load, and means for adding vectorially the voltage across a portion of said impedance circuit to the voltage across one half of said load.

12. A frequency discriminator comprising an input circuit, a balanced load connected across said input circuit, a reactive impedance connected across a porton of said load, and means for adding vectorially the voltage across a portion of said impedance to the voltage across each balanced portion of said load.

13. A frequency discriminator comprising an input circuit, a balanced load connected across said circuit, a series resonant reactance circuit connected across a portion of said load, and means for adding vectorially the voltage across one element of said reactance circuit to the voltage across each balanced portion of said load.

CHARLES E. DENNIS.

REFERENCES CITED

The following references are of record in the file of this patent:

UNITED STATES PATENTS

| Number | Name | Date |
|---|---|---|
| 2,100,394 | Heising | Nov. 30, 1937 |
| 2,190,319 | Koch | Feb. 12, 1940 |
| 2,203,857 | Beers | June 11, 1940 |
| 2,231,997 | Guanella | Feb. 18, 1941 |
| 2,333,990 | Dome | Nov. 9, 1943 |
| 2,411,605 | Webb | Nov. 26, 1946 |